MAGNETIC MEMORY

Filed April 27, 1962

INVENTORS
VICTOR T. SHAHAN
WILBERT L. SHEVEL, JR.
BY
ATTORNEY

United States Patent Office 3,204,227
Patented Aug. 31, 1965

3,204,227
MAGNETIC MEMORY

Victor T. Shahan, Wappinger Falls, and Wilbert L. Shevel, Jr., Peekskill, N.Y., assignors to International Business Machines Corporation, New York, N.Y., a corporation of New York Filed Apr. 27, 1962, Ser. No. 190,641
4 Claims. (Cl. 340—174)

The present invention relates to static magnetic storage and switching systems and is directed in particular to an anti-coincident and/or sequential current memory wherein the advantages of coincident current selection is retained.

Memory systems employing magnetic cores are well known in the data processing arts. Conventional core memory systems utilize the different remanent states of a bistable magnetic core, or combinations of several cores, to represent stored binary values. The cores are usually arranged in matrix formation and combinational input switching techniques are employed to central individual elements or group of elements in the array. Information is entered into a selected core by driving it to a predetermined stable state. The information is retrieved by driving the core to a reference state and examining the output induced in an output winding coupling the core. The magnitude of this output; or its polarity; or its relationship with another output indicates the value of the information retrieved.

It is well known that a bistable magnetic core exhibits a static or D.C. threshold below which an applied field will not produce an irreversible flux change regardless of duration. It has also been established that a bistable magnetic core exhibits a second switching threshold which is a function of both amplitude and duration of an applied field. This second threshold has been termed the dynamic threshold of the core and, as reported by V. L. Newhouse in an article entitled "The Utilization of Domain Wall Viscosity," appearing in the proceedings of the IRE, November 1957, a driving field much greater than the static switching threshold of a magnetic core does not produce significant irreversible flux switching if its duration is below some critical time. The field strength for a given duration at which some irreversible flux switching just occurs for a magnetic core has been termed the "turnover property" for the core as reported by W. C. Seelbach in an article entitled "Elastic Switching Properties of Some Square Loop Materials in Toroidal Structures," appearing in the Journal of Applied Physics, Supplement to Vol. 31, No. 5, pages 135S–136S, for May 1960.

In a copending application, Serial No. 76,807, filed on behalf of Michael Teig, which is assigned to the present assignee, a switching system is disclosed wherein a bistable magnetic core is energized by a first field having a magnitude in excess of the static switching threshold of the core but limited in duration such that the turnover property of the core is not exceeded so that the core is only switched to a partially switched remanent state. Upon termination of the first field, a second field is applied to the core whose magnitude is less than the static switching threshold of the core which causes further switching of the core to a different remanent condition. This phenomena has been explained in terms of static switching thresholds exhibited by the core for the major and minor loops. In a latter filed copending application, Serial No. 149,050, filed on behalf of Norbert G. Vogl, Jr. et al., also assigned to the same assignee, it is disclosed that the first field applied to the core causes a "relaxation" phenomenon to take place. This "relaxation" phenomenon is explained in terms of a transitory sensitized state which is established upon termination of the first field in which the switching threshold core is markedly reduced. It was found that this sensitized state existed for an appreciable time after termination of a sensitizing pulse during which time the second field whose magnitude is below the static switching threshold of the core causes irreversible flux change. This relaxation phenomena is then employed to construct a sequential-current selection memory as opposed to memories of the coincident-current type. In this copending application of N. G. Vogl, Jr. et al., it is specified that the sensitized condition is produced by applying a magnetizing field greater than the static threshold of the element but limited in time duration to irreversibly switch some flux in the element. That is, a sensitized condition is obtained when a core, after application of the magnetizing field, is to be left in a partially switched state. This sensitized condition is also utilized in another copending application filed on behalf of William T. Siegle, Serial No. 149,042, and now U.S. Patent No. 3,126,534, also assigned to the same assignee. In both copending applications of Vogl et al. and Siegle, it is recognized that the element may be sensitized when switched to saturation by the sensitizing field, however the amount of relaxation of the switching threshold and the time duration of this relaxed state is considered to be negligible and of little value. This latter finding is employed to an advantage in the application of Siegle in order to insure proper readout and regeneration for a memory system.

What has been found is that the relaxation effect of most bistable magnetic elements does have a duration which is great enough, when "sensitized" to saturation, to enable the application of the field having a magnitude less than the static switching threshold of the major loop exhibited by the core and cause irreversible switching of the core to a partially switched state.

Accordingly, it is a prime object of this invention to provide an improved switching system for a bistable magnetic core.

Another object of this invention is to provide an improved combinational input switching system wherein the relaxation phenomenon is employed to permit substantial flux switching when the core is sensitized at saturation and an input field is applied whose magnitude is lower than the static switching threshold of the core.

Still another object of this invention is to provide a high speed magnetic memory system which employs the relaxation phenomenon at saturation to store and read out information.

The foregoing and other objects, features and advantages of the invention will be apparent from the following more particular description of a preferred embodiment of the invention, as illustrated in the accompanying drawings.

As briefly mentioned earlier herein, the present invention takes advantage of a phenomena termed a "relaxation effect." This effect has been observed to exist in various magnetic materials which exhibit an appreciable remanence. The relaxation effect is observed to be quite pronounced in ferrite materials having low values of coercive force. Ferrites of the iron-manganese-zinc system are exemplary. The relaxation effect is manifested as a reduction in the switching threshold of the materials for a time following application of certain drive fields thereto. Before passing to a detailed description of this effect in the applications thereof, definition of the various terms involved will be given.

The term "bistable magnetic element" or "bistable magnetic core" as employed herein refers to a body of magnetic material having a substantial magnetic remanence and adapted to be inductively coupled to suitable magnetomotive force supplying windings.

The term "switching threshold" refers to that value of magnetomotive force which must be exceeded before an appreciable change in remanent magnetism is produced. This is sometimes referred to in terms of field intensity and sometimes in terms of current intensity. It may be referred to hereinafter in either of these terms.

The different thresholds are important to the present invention. The first of these is the "static" or "D.C." switching threshold which is defined as that value of magnetomotive force below which no appreciable irreversible switching normally occurs regardless of the time duration of the applied field. The other threshold is a function of time duration of the applied field as well as its amplitude termed "dynamic" threshold of the material.

In the following description, magnetic fields or the drive pulses which produce them will be referred to as being applied to a core in the "write" direction or the "read" direction. The "write" direction is the direction of the field which tends to switch the core toward the positive limiting remanent state, +B*r* in the diagram of FIG. 2, and the read direction is the direction of field which tends to switch the core to the negative limiting remanent state, —B*r* in FIG. 2.

The relaxation effect has been observed to exist in a bistable magnetic element following application of certain driving fields thereto. The effect is manifested as a transitory reduction in the switching threshold of the element, or stated somewhat differently, as a transitory sensitized condition of the element during which magnetomotive forces lower than a static threshold of the element are capable of producing appreciable irreversible flux changes. The sensitized condition is produced by applying to an element a magnetizing field greater than the static threshold of the element but limited in time duration such as not to exceed the "turnover" property of the core. This field will hereinafter be referred to as the "sensitizing" field.

Figure 2:
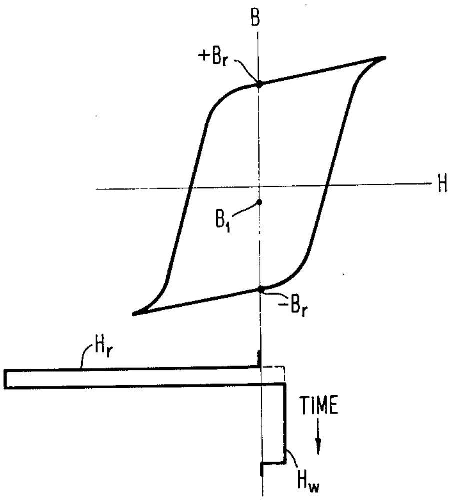
FIG. 2 is a hysteresis diagram of the core of FIG. 1.

If the element is initially residing in one of its limiting remanent states, —B*r* or +B*r* on the hysteresis loop of FIG. 2, a sensitizing pulse applied in a direction to drive the core towards saturation in the same polarity has heretofore been considered, not sufficient to produce any appreciable threshold reduction since, as previously described in the copending applications of N. G. Vogl, Jr. et al. and W. T. Siegle no irreversible switching is possible. Heretofore the core was considered only as being sensitized when the core residing in either of the limiting remanence states has applied thereto a pulse in such a direction as to tend to switch the core towards the opposite state and, if the core is initially residing in a partially switched state, for example at point B1 in FIG. 2, a sensitizing pulse in either direction would produce a substantial threshold reduction. The magnitude of the sensitizing field has been found to be greater than the magnitude defined by the static threshold of the element and is at least equal to if not greater than the dynamic threshold of the element. It has been found that the extent of the sensitization of the element is in part a function of the amplitude and duration of the sensitizing field in that fields above the dynamic threshold of the element produce much deeper and more lasting sensitizations than do lesser fields.

Figure 1:
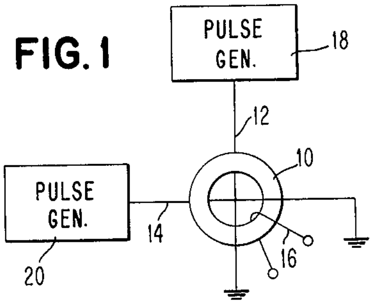
FIG. 1 is a schematic illustration of a magnetic core circuit that is operated in accordance with this invention.
Figure 3:
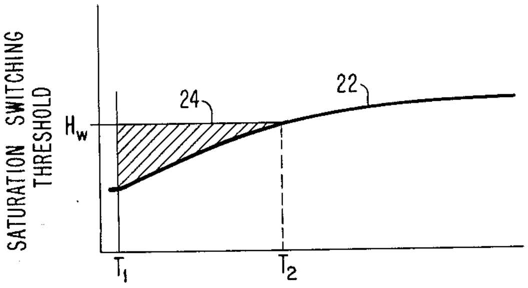
FIG. 3 is a graph illustrating the switching threshold variation experienced by the core of FIG. 1 when operated in accordance with this invention.

FIGS. 1, 2, and 3 of the drawings illustrate a bistable magnetic element adapted to be switched by combinational inputs making use of the relaxation effect, and the manner of its operation. Referring to FIG. 1 there is shown a core 10 of bistable magnetic material exhibiting the relaxation effect described above. Input windings 12 and 14 and an output winding 16 are magnetically coupled to the core. The windings 12 and 14 are connected to pulse generators 18 and 20, respectively, which are adapted, when activated, to supply currents of predetermined magnitude and duration of their associated windings.

Let it be assumed that the core 10 has been set to remanent state —B*r*, or to a remanent state B1, on its hysteresis loop shown in FIG. 2. To operate the core in accordance with the teachings of this invention, a high amplitude, short duration driving pulse is applied in the read direction from the generator 18. The magnitude and duration of the field applied to the core by energization of winding 12 is great enough to drive the core into negative saturation. The graph of FIG. 3 illustrates the threshold variation produced by this drive field. The vertical axis of graph represents the saturation switching threshold of the core 10 in the write direction and the horizontal axis represents time. The line 22 illustrates the variation in the saturation switching threshold of the core in response to a field H*r* applied by generator 18 energizing winding 12. Time T1 on the graph illustrates a point of termination of the field H*r*. At this time the threshold will be found to be reduced by a fraction of its static value. As time passes, the threshold value increases (along line 22 toward the right) until eventually it reaches a steady state value.

Following application of field H*r*, the generator 20 is activated to apply via winding 14 a low amplitude, long duration current pulse in the write direction. The amplitude of this pulse is adjusted to create a field H*w* which is lower than the static threshold of the core at point —B*r*, but greater than the relaxed threshold at least during a period T1 to T2. The field H*w* is indicated by line 24 in FIG. 3. Application of the field H*w* when the core 10 has been sensitized by field H*r*, causes the core to switch to remanence state B1. As indicated by a dotted pulse program in FIG. 2, the field H*w* could be applied in overlapping time coincidence with the field H*r* with satisfactory operation achieved. It is important to note that the field H*w* is below the static threshold of the core 10 at point —B*r* so if applied without sensitization or after the sensitization period has terminated, it will not disturb the core.

Figure 4:
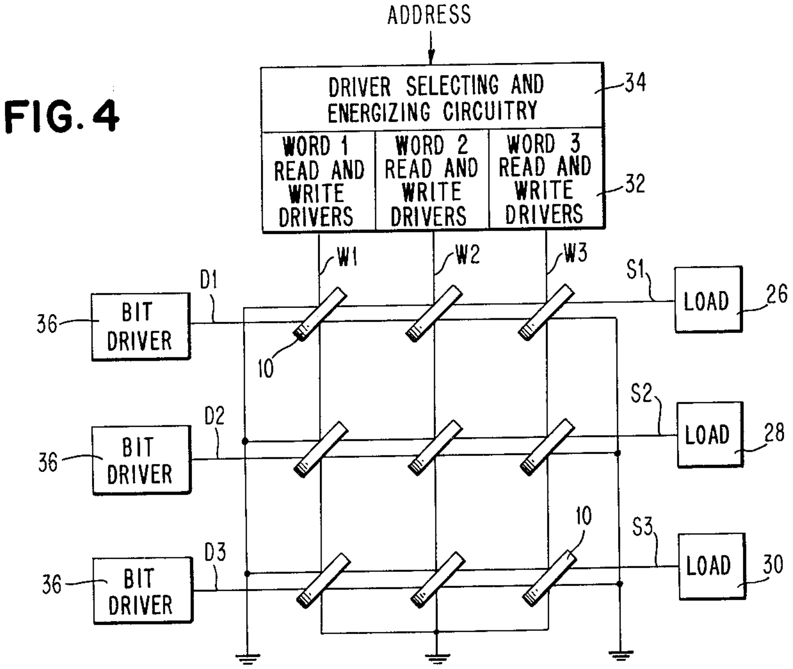
FIG. 4 is a schematic illustration of a memory system embodying the present invention.

Referring to FIG. 4, a memory system in which the relaxation characteristic exhibited by the bistable magnetic core is illustrated comprising a plurality of cores 10 arranged in word columns and bit rows. Separate word selection windings, W1, W2, and W3 couple all of the cores in each column in one sense. Separate bit or digit selecting windings D1, D2, and D3 couple all the cores in each row in the same sense. Sense windings S1, S2, and S3 are provided, one for each row connected to respective loads 26, 28, and 30. The word selecting windings W1–W3 are coupled to word drivers generally indicated at 32, provided for each word, which are controlled by a driver selecting and energizing circuit 34. The circuit 34 is effective to select and energize the drivers of selected words in response to address information supplied from some external source.

Each of the bit windings D1–D3 is coupled to a bit driver 36 which may be any pulse generator capable of supplying current pulses of a given polarity in response to a binary one input supplied thereto.

In the system of FIG. 4, a binary one is stored in a selected core by driving it to the level of point B1 on its hysteresis loop and a binary zero is stored by maintaining the core at —B*r*. Information is entered into the memory by energizing a word selection line W1, W2, or W3 to apply a field H*r* to each core 10 of the selected word column. As previously stated, the field H*r* causes each core, whether initially at B1 or —B*r*, to be negatively saturated. A voltage is thus induced on the respective sense lines S1–S3 indicative of the past history of the core, in that discriminations as to voltage amplitude is obtained distinguishing between a binary one, B1, or a binary zero, —B*r*. Each core of the selected word column is thus sensitized and upon termination of the field H*r* at time T1. The field H*w* is applied by each bit entry line D1, D2, or D3 only when a binary one is to be stored in the particular core coupled. The field H*w* is applied either in overlapping time coincidence with the field H*r* or within the duration T1 to T2 to cause irreversible switching of the core previously sensitized to the partially switched remanence state B1, representing a binary one value. Those cores, of the selected word column, not having the field H*w* applied thereto return to —B*r*, representing a stored binary zero value. The remaining cores coupled by the digit entry D1, D2, or D3 energized to apply the field H*w* experience little or no irreversible flux switching since the field H*w* is below this static switching threshold.

While the present invention has been illustated by a one-core-per-bit memory, it will be appreciated that the technique is equally adaptable to a two-core-per-bit system as shown in the copending applications of N. G. Vogl, Jr., et al., op. cit., and W. T. Siegle, op. cit. Further, while the present invention has been described herein with reference to a two-dimensional system it should be understood that the invention is also applicable to memory systems which store information in three-dimensional arrays.

In order to aid in understanding and practicing the invention and to provide a starting place for one skilled in the fabrication of the circuits of the invention, the following set of specifications for one embodiment of FIG. 4 is provided below. It should be understood, however, that no limitation should be construed since other component values and operating fields may be employed with satisfactory operation.

In the embodiment of FIG. 4, each of the cores 10 may be of the type disclosed in U.S. Patent 2,950,252, assigned to the same assignet, where each core has an inside diameter of 0.030 inch, outside diameter of 0.050 inch being 0.012 inch thick. The core may have a static switching threshold of 1.80 amphere turns, hereinafter abbreviated as AT, and exhibit a total flux for irreversible switching of approximately 0.6 maxwells. Each core may be magnetized by a word field H*r* having a magnitude of approximately 17.4 AT for a duration of 1.0 microseconds. The digit field H*w* may be applitd immediately upon termination of the word field or during application of the word field in overlapping anti-coincidence fashion. The field H*w* may have a magnitude of approximately 0.28 AT for an approximate duration of from 5–10 microseconds.

While the invention has been particularly shown and described with reference to a preferred embodiment thereof, it will be understood by those skilled in the art that various changes in form and details may be made therein without departing from the spirit and scope of the invention.

What is claimed is:

1. A magnetic memory comprising, a plurality of cores arranged in columns and rows, each said core exhibiting opposite limiting remanence states and a plurality of intermediate remanence states and having a switching threshold associated with each remanence state which must be exceeded by a magnetizing field before the core can be switched from the associated remanence state, each said core having a characteristic that a sensitizing field sufficient to switch the core from any remanence state to saturation in one of the limiting remanence states produces a transitory sensitized condition which exists for a finite time after termination of the sensitizing field and during which a magnetizing field less than the static threshold of the core in the limiting remanence state to which it is driven by said sensitizing force can irreversibly switch said core to an intermediate remanence state, a plurality of column conductors each coupling all the cores in a respective column, a plurality of row conductors each coupling all the cores in a respective row, first means including a selected one of said column conductors for applying a first magnetizing field to each core of the selected column to saturate the cores in a datum limiting remanence state and sensitize each core of the selected column, and means comprising row drive lines for applying during the existence of said sensitized condition, a second magnetizing field of opposite polarity to selected cores in said selected column having a magnitude less than the static switching threshold value associated with a limiting remanence state of said core but greater than the reduced threshold to irreversibly switch the selected cores in said selected column to one of said intermediate remanence states.

2. The memory of claim 1 wherein the second magnetizing field is applied during application of said first magnetizing field and terminated after termination of said first magnetizing field.

3. The memory of claim 1, wherein said second magnetizing field is applied upon termination of said first magnetizing field during existence of said sensitized condition.

4. In a circuit, a bistable magnetic core having two limiting remanence states and a plurality of intermediate remanence states and having a static switching threshold associated with each said remanence state which must be exceeded before the core can be switched from the said state, said core having a characteristic that a sensitizing magnetizing field sufficient in magnitude to drive the core from an occupied remanence state to saturation produces a transistory sensitized condition which exists for a finite time after termination of the sensitizing field and during which the switching threshold associated with the limiting remanence states is reduced to a fraction of the static value to which it returns upon termination of the sensitized condition, sensitizing means for applying a sensitizing field of one polarity to said core sufficient to saturate said core in a datum limiting remanence state and produce a transistory sensitized condition, and means for applying, during the existence of said sensitized condition, a magnetizing field of a polarity opposite to that of said one polarity to the core having a magnitude less than the static switching threshold value associated with a limiting remanence state of said core but greater than the reduced threshold to irreversibly switch said core to one of said intermediate remanence states, said magnetizing field of opposite polarity being applied during application of the sensitizing field and terminated after termination of said sensitizing field.

References Cited by the Examiner

UNITED STATES PATENTS 3,126,534 3/64 Siegle ---------------- 340—174

IRVING L. SRAGOW, *Primary Examiner.*